United States Patent
Ash et al.

(10) Patent No.: US 10,114,753 B2
(45) Date of Patent: Oct. 30, 2018

(54) USING CACHE LISTS FOR MULTIPLE PROCESSORS TO CACHE AND DEMOTE TRACKS IN A STORAGE SYSTEM

(71) Applicant: INTERNATIONAL BUSINESS MACHINES CORPORATION, Armonk, NY (US)

(72) Inventors: Kevin J. Ash, Tucson, AZ (US); Matthew G. Borlick, Tucson, AZ (US); Lokesh M. Gupta, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/832,626

(22) Filed: Aug. 21, 2015

(65) Prior Publication Data

US 2017/0052897 A1  Feb. 23, 2017

(51) Int. Cl.
*G06F 12/00* (2006.01)
*G06F 12/0891* (2016.01)
*G06F 12/122* (2016.01)

(52) U.S. Cl.
CPC ........ *G06F 12/0891* (2013.01); *G06F 12/122* (2013.01); *G06F 2212/1024* (2013.01); *G06F 2212/1044* (2013.01)

(58) Field of Classification Search
CPC .................................................. G06F 12/0891
See application file for complete search history.

(56) References Cited

U.S. PATENT DOCUMENTS

| | | | |
|---|---|---|---|
| 4,574,346 A | 3/1986 | Hartung | |
| 4,638,425 A | 1/1987 | Hartung | |
| 5,542,066 A | 7/1996 | Mattson et al. | |
| 5,717,893 A * | 2/1998 | Mattson | G06F 12/084 |
| | | | 711/129 |
| 5,742,792 A | 4/1998 | Yanai et al. | |
| 5,889,935 A | 3/1999 | Ofek et al. | |
| 6,012,126 A | 1/2000 | Aggarwal et al. | |
| 6,052,797 A | 4/2000 | Ofek et al. | |

(Continued)

OTHER PUBLICATIONS

R. Sampson, et al., "ZCache Skew-ered", Advanced Computer Architecture Lab University of Michigan, pp. 9, Published in Proc. of the 9th Annual Workshop on Duplicating, Deconstructing, and Debunking (2011).

(Continued)

*Primary Examiner* — David Yi
*Assistant Examiner* — Craig S Goldschmidt
(74) *Attorney, Agent, or Firm* — David W. Victor; Konrad Raynes Davda & Victor LLP

(57) ABSTRACT

Provided are a computer program product, system, and method for using cache lists for multiple processors to cache and demote tracks in a storage system. Tracks in the storage stored in the cache are indicated in lists, wherein there is one list for each of a plurality of processors. Each of the processors processes the list for that processor to process the tracks in the cache indicated on the list. A determination is made of one of the lists from which to select one of the tracks in the cache indicated in the determined list to demote. The selected track is demoted from the cache.

22 Claims, 6 Drawing Sheets

(56) References Cited

U.S. PATENT DOCUMENTS

| | | | |
|---|---|---|---|
| 6,327,644 B1 * | 12/2001 | Beardsley | G06F 12/123 711/113 |
| 6,615,318 B2 | 9/2003 | Jarvis et al. | |
| 6,851,024 B1 | 2/2005 | Wilkes et al. | |
| 6,965,970 B2 * | 11/2005 | Mosur | G06F 12/0804 711/118 |
| 7,260,679 B2 * | 8/2007 | Benhase | G06F 12/123 711/113 |
| 9,665,493 B2 | 5/2017 | Ash et al. | |
| 9,710,398 B2 | 7/2017 | Ash et al. | |
| 2008/0021853 A1 * | 1/2008 | Modha | G06F 12/123 706/44 |
| 2013/0097387 A1 | 4/2013 | Sanchez Martin et al. | |
| 2013/0111133 A1 | 5/2013 | Benhase et al. | |
| 2013/0185502 A1 | 7/2013 | Ash et al. | |
| 2014/0082296 A1 | 3/2014 | Ash et al. | |
| 2014/0223106 A1 | 8/2014 | Shivashankaraiah et al. | |
| 2015/0026409 A1 | 1/2015 | Ash et al. | |
| 2016/0098295 A1 | 4/2016 | Ash et al. | |
| 2016/0140053 A1 | 5/2016 | Ash et al. | |
| 2016/0321189 A1 | 11/2016 | Ash et al. | |
| 2017/0052822 A1 | 2/2017 | Ash et al. | |
| 2017/0052898 A1 | 2/2017 | Ash et al. | |
| 2017/0052902 A1 | 2/2017 | Ash et al. | |
| 2017/0052903 A1 | 2/2017 | Ash et al. | |
| 2018/0150402 A1 | 5/2018 | Ash et al. | |
| 2018/0157594 A1 | 6/2018 | Ash et al. | |
| 2018/0203735 A1 | 7/2018 | Ash et al. | |

OTHER PUBLICATIONS

B.S. Gill, et al., "SARC: Sequential Prefetching in Adaptive Replacement Cache", USENIX Association, 2005 USENIC Annual Technical Conference, 2005, pp. 16.

K. Kedzierski, et al., "Adapting Cache Partitioning Algorithms to Pseudo-LRU Replacement Policies", IEEE, 2010, pp. 12.

Document entitled List of Patents or Patent Applications Treated as Related, dated Aug. 21, 2015, pp. 2.

U.S. Appl. No. 14/832,596, filed Aug. 21, 2015.
U.S. Appl. No. 14/832,614, filed Aug. 21, 2015.
U.S. Appl. No. 14/832,642, filed Aug. 21, 2015.
U.S. Appl. No. 14/832,670, filed Aug. 21, 2015.
Response dated Oct. 18, 2017, pp. 9, to Office Action dated Jul. 18, 2017, pp. 26, for U.S. Appl. No. 14/832,614, filed Aug. 21, 2015.
Notice of Allowance dated Nov. 3, 2017, pp. 13, for U.S. Appl. No. 14/832,614, filed Aug. 21, 2015.
Response dated Oct. 27, 2017, pp. 12, to Office Action dated Jul. 27, 2017, pp. 25, for U.S. Appl. No. 14/832,642, filed Aug. 21, 2015.
Response dated Nov. 13, 2007, pp. 13, to Office Action dated Aug. 11, 2017, pp. 24, for U.S. Appl. No. 14/832,596, filed Aug. 21, 2015.
Notice of Allowance dated Nov. 17, 2017, pp. 11, for U.S. Appl. No. 14/832,642, filed Aug. 21, 2015.
Response dated Nov. 20, 2017, pp. 16, to Office Action dated Aug. 18, 2017, pp. 21, for U.S. Appl. No. 14/832,670, filed Aug. 21, 2015.
Notice of Allowance dated Dec. 1, 2017, pp. 15, for U.S. Appl. No. 14/832,596, filed Aug. 21, 2015.
Office Action dated Aug. 11, 2017, pp. 24, for U.S. Appl. No. 14/832,596, filed Aug. 21, 2015.
Office Action dated Jul. 18, 2017, pp. 26, for U.S. Appl. No. 14/832,614, filed Aug. 21, 2015.
Office Action dated Jul. 27, 2017, pp. 25, for U.S. Appl. No. 14/832,642, filed Aug. 21, 2015.
Office Action dated Aug. 18, 2017, pp. 21, for U.S. Appl. No. 14/832,670, filed Aug. 21, 2015.
Notice of Allowance dated Dec. 19, 2017, pp. 15, for U.S. Appl. No. 14/832,670, filed Aug. 21, 2015.
U.S. Appl. No. 15/884,155, filed Jan. 30, 2018.
Office Action dated Mar. 22, 2018, pp. 13, for U.S. Appl. No. 15/884,155, filed Jan. 30, 2018.
U.S. Appl. No. 15/884,162, filed Jan. 30, 2018.
U.S. Appl. No. 15/919,205, filed Mar. 12, 2018.
List of IBM Patents or IBM Patent Applications Treated As Related, dated Mar. 26, pp. 2.
Office Action dated Mar. 30, 2018, pp. 13, for U.S. Appl. No. 15/884,162, filed Jan. 30, 2018.
Notice of Allowance dated Apr. 27, 2018, pp. 10, for U.S. Appl. No. 14/832,642, filed Aug. 21, 2015.
Notice of Allowance dated May 17, 2018, pp. 10, for U.S. Appl. No. 14/832,596, filed Aug. 21, 2015.
Response dated Jul. 23, 2018, pp. 14 to Office Action dated Mar. 22, 2018, pp. 13, for U.S. Appl. No. 15/884,155, filed Jan. 30, 2018.
Response dated Jul. 2, 2018, pp. 14, to Office Action dated Mar. 30, 2018, pp. 13, for U.S. Appl. No. 15/884,162, filed Jan. 30, 2018.
U.S. Appl. No. 16/008,017, filed Jun. 5, 2018.
List of IBM Patents or IBM Patent Applications Treated as Related, dated Aug. 9, 2018, pp. 2.

* cited by examiner

Cache Control Block

LRU List Information

USING CACHE LISTS FOR MULTIPLE PROCESSORS TO CACHE AND DEMOTE TRACKS IN A STORAGE SYSTEM

BACKGROUND OF THE INVENTION

1. Field of the Invention

The present invention relates to a computer program product, system, and method for using cache lists for multiple processors to cache and demote tracks in a storage system.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

A cache management system may maintain a linked list having one entry for each track stored in the cache, which may comprise write data buffered in cache before writing to the storage device or read data. In the commonly used Least Recently Used (LRU) cache technique, if a track in the cache is accessed, i.e., a cache "hit", then the entry in the LRU list for the accessed track is moved to a Most Recently Used (MRU) end of the list. If the requested track is not in the cache, i.e., a cache miss, then the track in the cache whose entry is at the LRU end of the list may be removed and demoted and an entry for the track data staged into cache from the storage is added to the MRU end of the LRU list. With this LRU cache technique, tracks that are more frequently accessed are likely to remain in cache, while data less frequently accessed will more likely be removed from the LRU end of the list to make room in cache for newly accessed tracks.

When processes access a track in the cache, a track identifier of the accessed cache needs to be moved to the MRU end of the LRU list. To move a track identifier to the MRU end, a lock needs to be obtained on the LRU list. If multiple processes are trying to access the cache, then contention for the LRU list lock among the multiple processes may delay cache processing. One technique for addressing LRU list lock contention is to defer MRU processing and perform the MRU processing to move track identifiers to the MRU end of the list in a batch mode.

SUMMARY

Provided are a computer program product, system, and method for using cache lists for multiple processors to cache and demote tracks in a storage system. Tracks in the storage stored in the cache are indicated in lists, wherein there is one list for each of a plurality of processors. Each of the processors processes the list for that processor to process the tracks in the cache indicated on the list. A determination is made of one of the lists from which to select one of the tracks in the cache indicated in the determined list to demote. The selected track is demoted from the cache.

DETAILED DESCRIPTION

As processing power increases, the number of independent central processing unit (CPU) threads that can separately access the cache also increases. Whenever one of the threads accesses a track in the cache, the thread needs to obtain a lock on the LRU list to move the track identifier of the accessed track to the MRU end of the LRU list. An increased number of threads accessing the cache increases contention for the LRU list lock, which may delay other processes access to the cache.

Described embodiments address the LRU list lock contention issues introduced by increasing processing capacity by having multiple LRU lists, where each processor is assigned a separate LRU list to access, having a separate LRU list lock. This reduces contention, by providing separate LRU lists for the processors to access. Further, when a track is added to the cache, the track identifier is distributed across the LRU lists for the different processors. When demoting tracks from cache, one of the LRU lists is selected so that the track to demote is selected from the selected LRU list.

Figure 1:
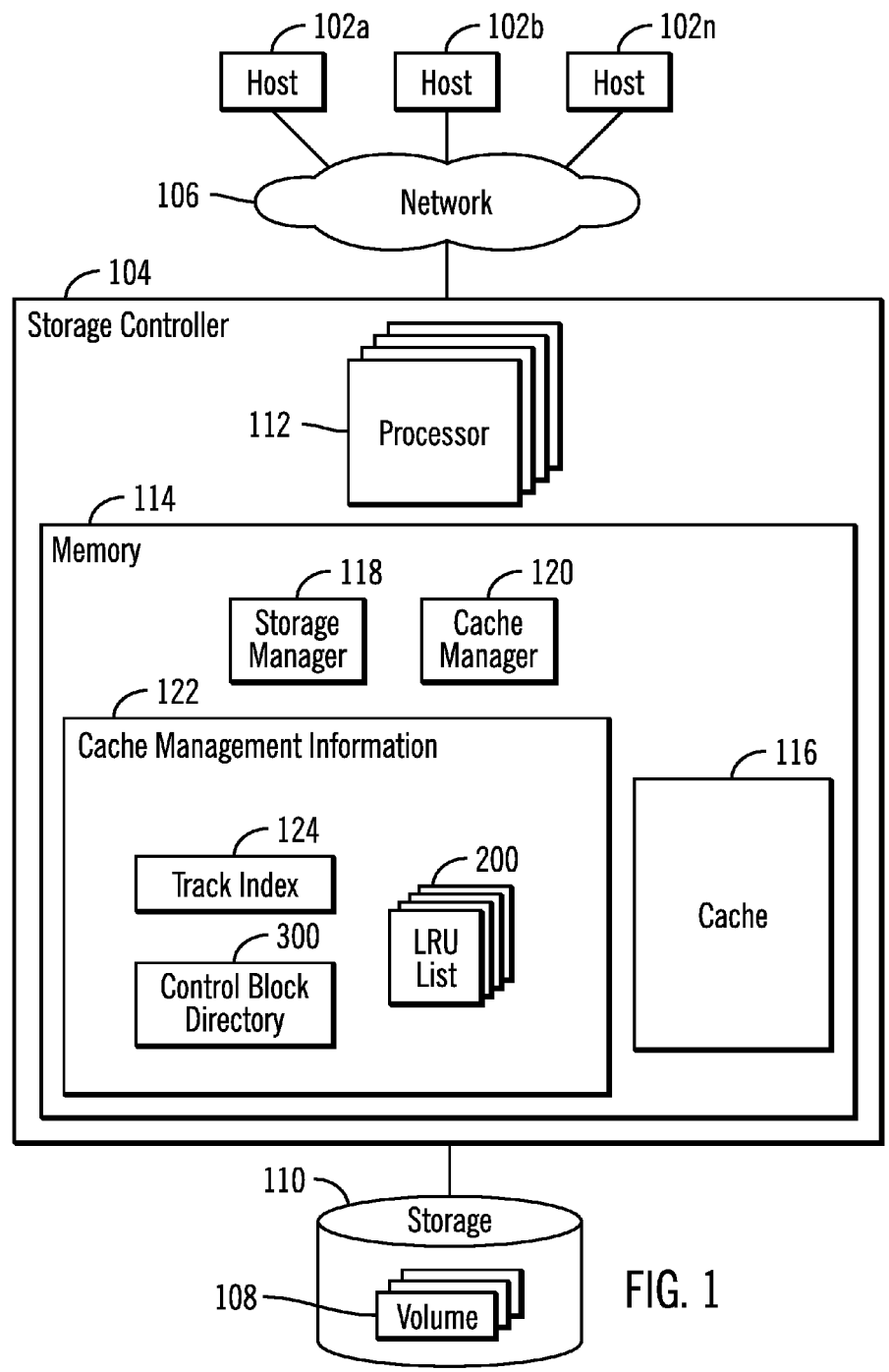
FIG. 1 illustrates an embodiment of a computing environment.

FIG. 1 illustrates an embodiment of a computing environment. A plurality of hosts 102a, 102 b . . . 102n may submit Input/Output (I/O) requests to a storage controller 104 over a network 106 to access data at volumes 108 (e.g., Logical Unit Numbers, Logical Devices, Logical Subsystems, etc.) in a storage 110. The storage controller 104 includes a plurality of processors 112 and a memory 114, including a cache 116 to cache data for the storage 110. Each of the processors 112 may comprise a separate central processing unit (CPU), one or a group of multiple cores on a single CPU, or a group of processing resources on one or more CPUs. The cache 116 buffers data transferred between the hosts 102a, 102b . . . 102n and the volumes 108 in the storage 110.

The memory 114 further includes a storage manager 118 for managing the transfer of tracks transferred between the hosts 102a, 102b . . . 102n and the storage 110 and a cache manager 120 that manages data transferred between the hosts 102a, 102b . . . 102n and the storage 110 in the cache 116. A track may comprise any unit of data configured in the storage 110, such as a track, Logical Block Address (LBA), etc., which is part of a larger grouping of tracks, such as a volume, logical device, etc.

The cache manager 120 maintains cache management information 122 in the memory 114 to manage read (unmodified) and write (modified) tracks in the cache 116. The cache management information 122 may include a track index 124 providing an index of tracks in the cache 116 to cache control blocks in a control block directory 300 and a plurality of Least Recently Used (LRU) lists 200 providing a temporal ordering of tracks in the cache 116. In one embodiment, there is at least one LRU list 200 for each of the processors 112. In this way, each of the processors $112_i$ may independently process the LRU list $200_i$ associated with the processor $112_i$ to process the tracks in the cache indicated in the processor LRU list $200_i$. The control block directory 300 includes the cache control blocks, where there is one cache control block for each track in the cache 116 providing metadata on the track in the cache 116. The track index 124 associates tracks with the cache control blocks providing information on the tracks in the cache. Upon determining that the cache 116 is full or has reached a threshold level, the LRU lists 200 are used to demote tracks from the cache 116 to the volume 108 in the storage 110.

The demotion operation may involve discarding the track in the cache 116, such as by indicating the cache control block for the demoted track in a free queue. The cache control block for the demoted track may be selected from the free queue to use for a new track to add to the cache 116 and at that time any data from the demoted track would be overwritten by the new track. Alternatively, the demoted track may be erased immediately when demoted.

In the described embodiments, the lists 200 comprise LRU lists. In alternative embodiments, the lists 200 may comprise other types of lists to organize indication of tracks in the cache 116.

The storage manager 118 and cache manager 120 are shown in FIG. 1 as program code loaded into the memory 114 and executed by one or more of the processors 112. Alternatively, some or all of the functions may be implemented in hardware devices in the storage controller 104, such as in Application Specific Integrated Circuits (ASICs).

The storage 110 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 114 may comprise a suitable volatile or non-volatile memory devices, including those described above.

The network 106 may comprise a Storage Area Network (SAN), a Local Area Network (LAN), a Wide Area Network (WAN), the Internet, and Intranet, etc. Alternatively, the hosts 102a, 102b . . . 102n may connect to the storage controller 104 over a bus interface, such as a Peripheral Component Interconnect (PCI) bus interface and other interfaces known in the art.

Figure 2:
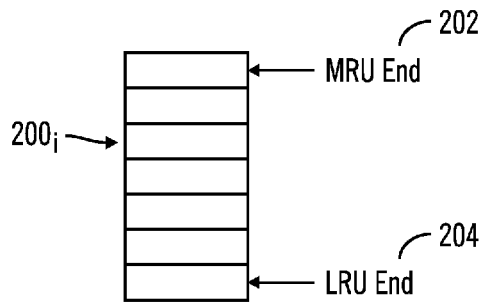
FIG. 2 illustrates an embodiment of a Least Recently Used (LRU) list.

FIG. 2 illustrates an embodiment of one of the LRU lists $200_i$ as having a most recently used (MRU) end 202 identifying a track most recently added to the cache 116 or most recently accessed in the cache 116 and a least recently used (LRU) end 204 from which the track identified at the LRU end 204 is selected to demote from the cache 116. The LRU end 204 points to a track identifier, such as a track identifier address or a cache control block index for the track, of the track that has been in the cache 116 the longest for tracks indicated in that list $200_i$.

Figure 3:
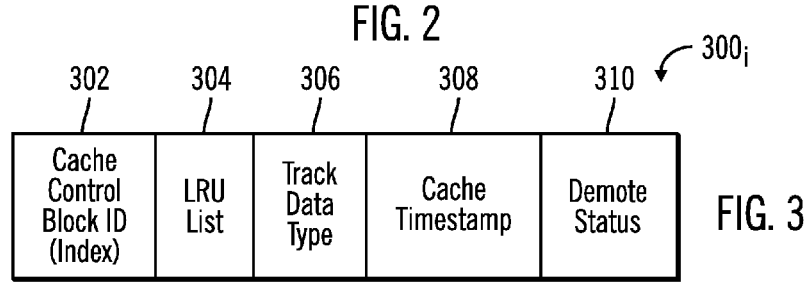
FIG. 3 illustrates an embodiment of a cache control block.

FIG. 3 illustrates an embodiment of an instance of a cache control block $300_i$ for one of the tracks in the cache 116, including, but not limited to, a cache control block identifier 302, such as an index value of the cache control block $300_i$; the LRU list 304, e.g., one of LRU lists $200_i$, in which the track associated cache control block $300_i$ is indicated; a track data type 306, such as unmodified sequentially accessed track, unmodified non-sequentially accessed track, etc.; a cache timestamp 308 indicating a time the track was added to the cache 116 and indicated on the LRU list 304; and a demote status 310 indicating whether the track identified by the cache control block $300_i$ is to be demoted from the cache 116.

In certain embodiments, the cache timestamp 308 may be set to a sequence number that that is periodically incremented, such as at every clock cycle or couple of milliseconds. When the track is added to the cache 116, the timestamp 308 is set to the current value for the sequence number.

Figure 4:
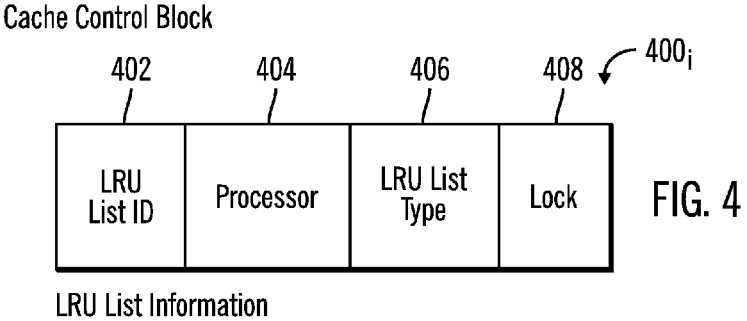
FIG. 4 illustrates an embodiment of LRU list information.

FIG. 4 illustrates an embodiment of LRU list information $400_i$, maintained for each of the LRU lists $300_i$ to provide metadata on the LRU list $300_i$, including, but not limited to, a LRU list identifier (ID) 402; a processor 404 comprising one of the processors 112 that is dedicated to processing the identified LRU list 402; an LRU list type 406 indicating a type of track managed on the LRU list 402, such as unmodified sequentially accessed track, unmodified non-sequentially accessed track, etc.; and a lock 408 that is accessed by a transaction in order to have exclusive access to the LRU list 402 for the purpose of adding track identifiers to the MRU end 202 or demoting tracks identified at the LRU end 204.

As mentioned, a track is associated with the cache control block $300_i$ providing information through the track index 124. Further, the cache control block index 302 can identify the location of the track in the cache 116, as the cache control block indexes are numbered sequentially and may provide offsets in the cache 116 at which the track is located.

In one embodiment, there may be only one set of LRU lists 300 for all the different types of data. In an alternative embodiment, there may be different sets of LRU lists for different types of data. In this way, tracks of a specific data type are managed in the LRU lists for that data type. For each data type, there are a plurality of LRU lists, one for each of the processors 112, and a cumulative counter indicating all the tracks identified in the LRU lists for the data type, i.e., all the tracks of the data type in the cache 116.

Figure 5:
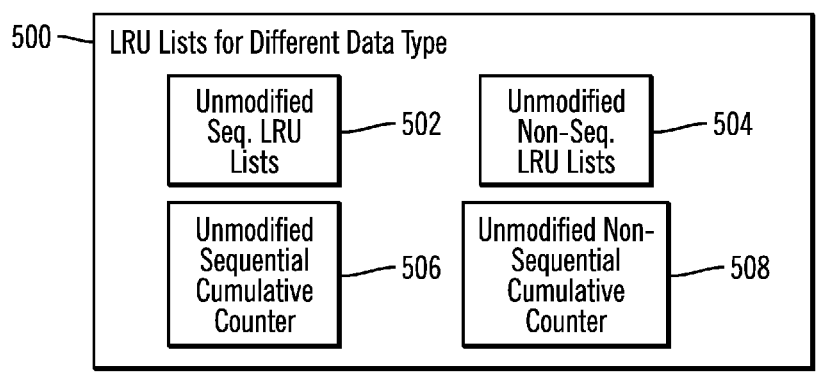
FIG. 5 illustrates an embodiment of LRU lists for different data types.

FIG. 5 illustrates an embodiment of LRU lists for different data types 500, such as unmodified sequentially accessed data and unmodified non-sequentially accessed data. In such embodiments, each of the processors 112 has one of the LRU lists for each of the different data types. For instance, there are unmodified sequential LRU lists 502, one for each of the processors 112, for unmodified sequentially accessed data staged into the cache 116, and unmodified non-sequential LRU lists 504, one for each of the processors 112, for unmodified non-sequentially accessed data staged into the cache 116. An unmodified sequential cumulative counter 506 indicates a number of unmodified sequential tracks in the cache 116 indicated on the unmodified sequential LRU lists 502 for all the processors 112. An unmodified non-sequential cumulative counter 508 indicates a number of unmodified non-sequential accessed tracks in the cache 116 indicated on the unmodified non-sequential LRU lists 504 for all the processors 112.

Figure 6:
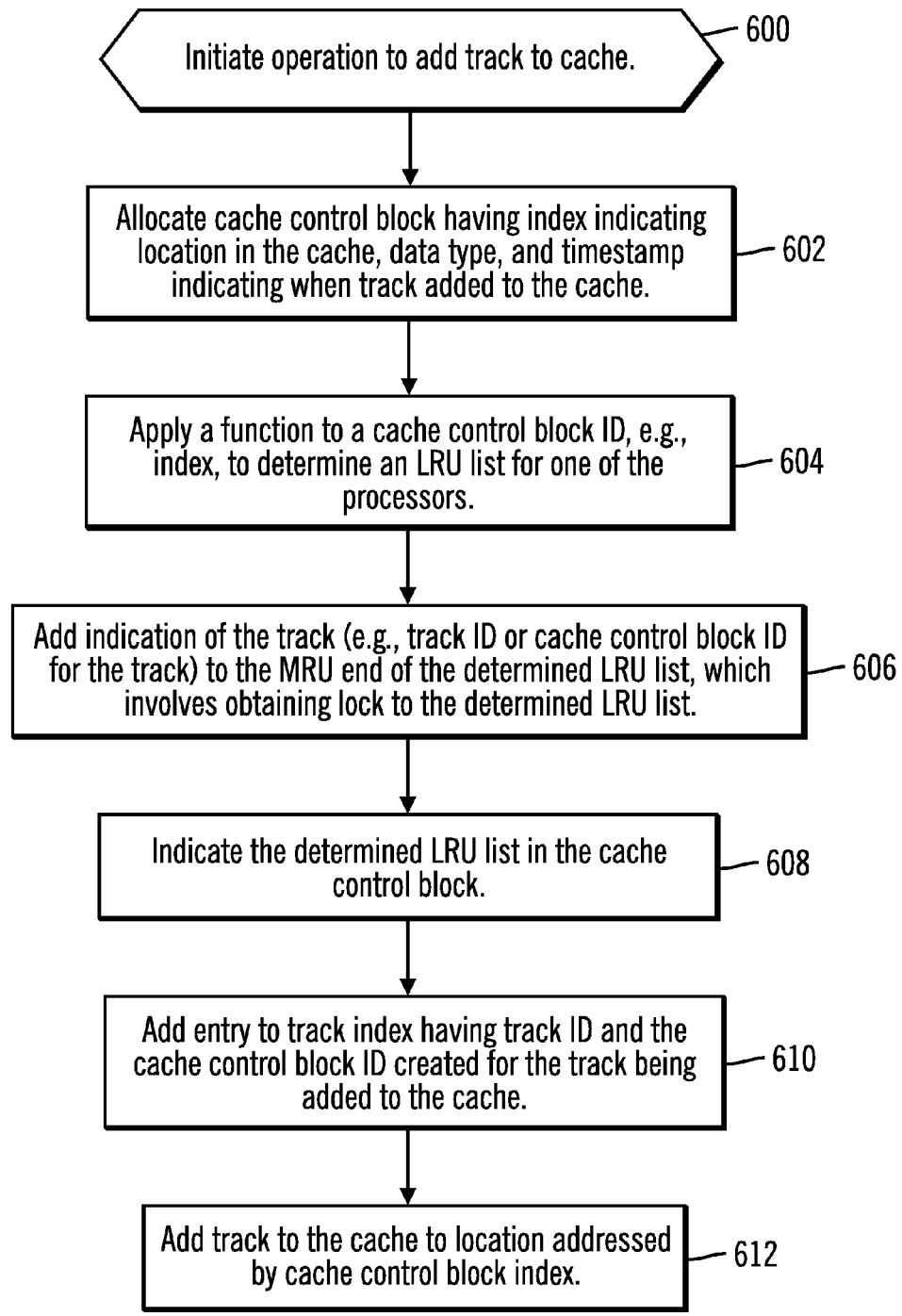
FIG. 6 illustrates an embodiment of operations to add a track to the cache.

FIG. 6 illustrates an embodiment of operations performed by the cache manager 120 to add a track to the cache 116, which may comprise a track being staged into the cache 116 from the storage 110 for read access or as part of a prefetch operation. Upon initiating (at block 600) the operation to add a track to the cache 116, a cache control block $300_i$ is allocated (at block 602) having an index 302 identifying a location or offset of the track in the cache 116, the data type 306, e.g., unmodified sequential accessed data, unmodified non-sequentially accessed data, etc., and a cache timestamp 308 indicating a time the track was added to the cache 116. Further, the demote status 310 indicates not to demote because the track would be added to the MRU end 202 of the LRU list 200. The cache manager 120 applies (at block 604) a function to the cache control block ID $300_i$ to determine an LRU list $200_i$ for one of the processors 112. For instance, the function may comprise a hash function applied to the cache control block index to produce an LRU list number to equally distribute the cache control block index values to the LRU lists 200. For instance, the function may comprise x modulo n, where x is the cache block index number, and n is the number of LRU lists 200, such that the result of the function determines the LRU list in which to indicate the cache control block. The function may distribute the tracks among the LRU lists 200 to provide an equal number of tracks on the LRU lists 200. In certain embodiments, the function distributes tracks to LRU lists independent of which processor 112 is accessing the track. For instance, a track accessed by one processor may be added to an LRU lists 200 associated with a processor other than the processor that accessed the track to cause the placement in cache 116.

Indication of the track (e.g., such as a track ID or cache control block ID, e.g., index), for the track), is added (at block 606) to the MRU end 202 of the determined LRU list $200_i$. The cache manager 120 may obtain the lock 408 on the determined LRU list $200_i$ in order to add the track ID to the MRU end 202 of the list $200_i$. The determined LRU list $200_i$ is indicated (at block 608) in field 304 of the cache control block $300_i$. An entry is added (at block 610) to the track index 124 associating the track ID with the cache control block $300_i$ created for the track being added to the cache 116. The track is then added (at block 612) to the cache 116 to a location addressed by the cache control block index.

With the described operation of FIG. 6, tracks are distributed among the LRU lists 200 for the processors to provide load balancing of tracks in the LRU lists to even out the workload of the processors 112 assigned to process the LRU lists 200.

In embodiments where there are different types of lists, such as in FIG. 5, the cache manager 120 would first determine the data type of the track to add to the cache 116 and then add the track to one of the LRU lists 502, 504 for that determined data type and indicate the determined data type in the cache control block $300_i$.

Figure 7:
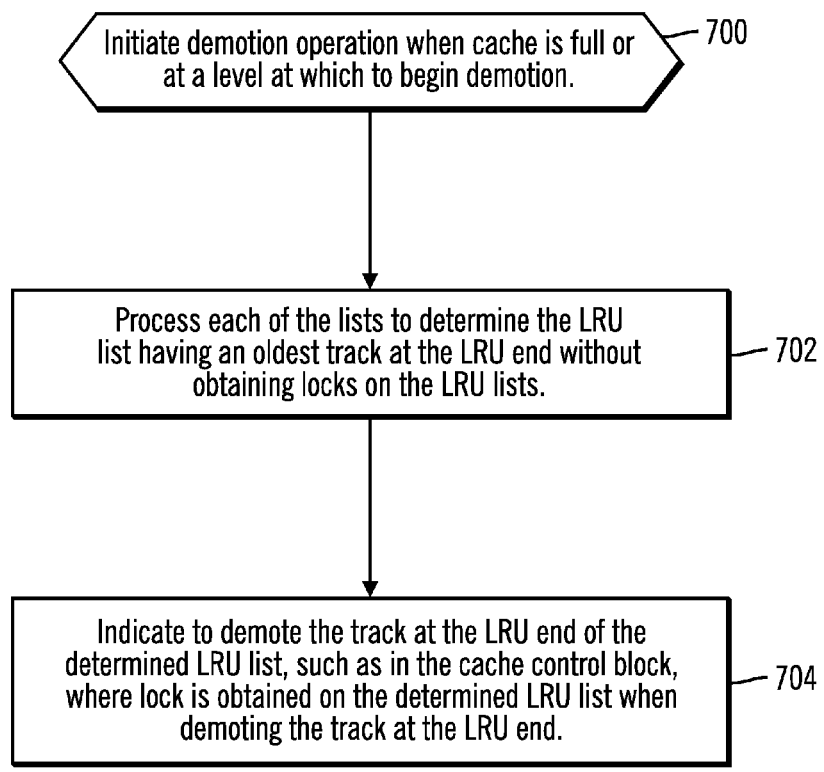
FIGS. 7 and 8 illustrate embodiments of operations to demote tracks from the cache.

FIG. 7 illustrates an embodiment of a demotion operation performed by the cache manager 120 when the cache 116 is full or has reached a recent threshold level of tracks. Upon initiating (at block 700) an operation to demote a track, the cache manager 120 processes (at block 702) each of the lists 200 to determine the LRU list $200_i$ having the track that has been in the cache 116 the longest, i.e., the track at the LRU end 204 of the lists 200 having the oldest cache timestamp 308. In certain embodiments, the cache manager 120 determines the oldest track at the LRU end 204 of the processed LRU lists 200 without obtaining the locks 408 on the LRU lists 200 to avoid lock contention with other processes accessing the LRU lists 200 to process tracks in the cache 116. The cache manager 120 indicates (at block 704) to demote the track at the LRU end 204 of the determined LRU list $200_i$, by updating the demote status 110 to indicate to demote. The cache manager 120 would obtain the lock 408 when performing the demoting of the track. The demote may be performed at predetermined intervals to batch demote multiple tracks whose cache control block $300_i$ has the demote status 110. Alternatively, a track may be demoted after determining the track to have the demote status.

Figure 8:
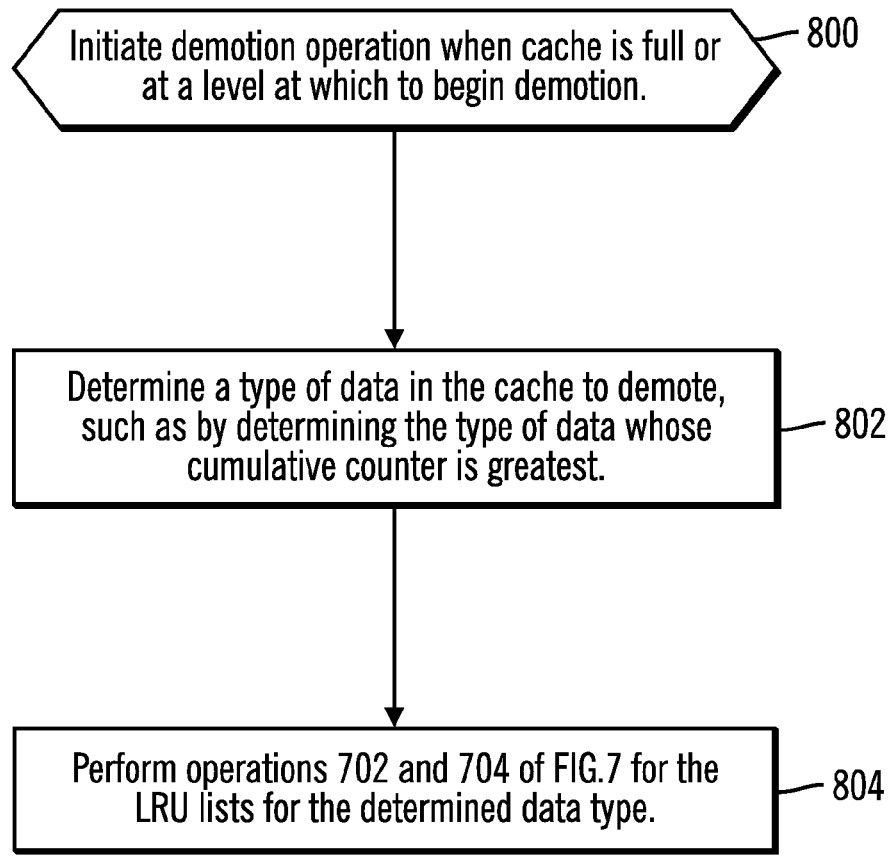

FIG. 8 illustrates an embodiment of operations performed by the cache manager 120 to determine a track to demote from cache 116 when there are multiple sets of LRU lists for different data types, such as the sets of LRU lists 502, 504. Upon initiating (at block 800) the operation to select a track to demote from the cache 116, the cache manager 120 determines (at block 802) a type of data in the cache 116 to demote. In one embodiment, the cache manager 120 may execute an algorithm to select a data type such that the selection will have the minimal impact on the cache hit ratio, i.e., maximize the cache hit ratio. In one embodiment, this may be selecting the data type whose cumulative counter 506 and 508 is the greatest. In alternative embodiments, other techniques may be used such as by selecting a data type whose data has been less frequently accessed in the cache 116. The cache manager 120 may then perform (at block 804) the operations at block 702 and 704 of FIG. 7 for the LRU lists 502, 504 for the determined data type, e.g., unmodified sequential data and unmodified non-sequential data.

Described embodiments provide techniques for partitioning LRU lists by processor, such that there is one LRU list per processor. In this way, contention is reduced by assigning each processor an LRU list to process. Further, a function may be applied to a cache control block index or identifier to determine an LRU list on which to include a track identifier to equally distribute the tracks in cache across the LRU lists to load balance LRU list processing by the processors.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
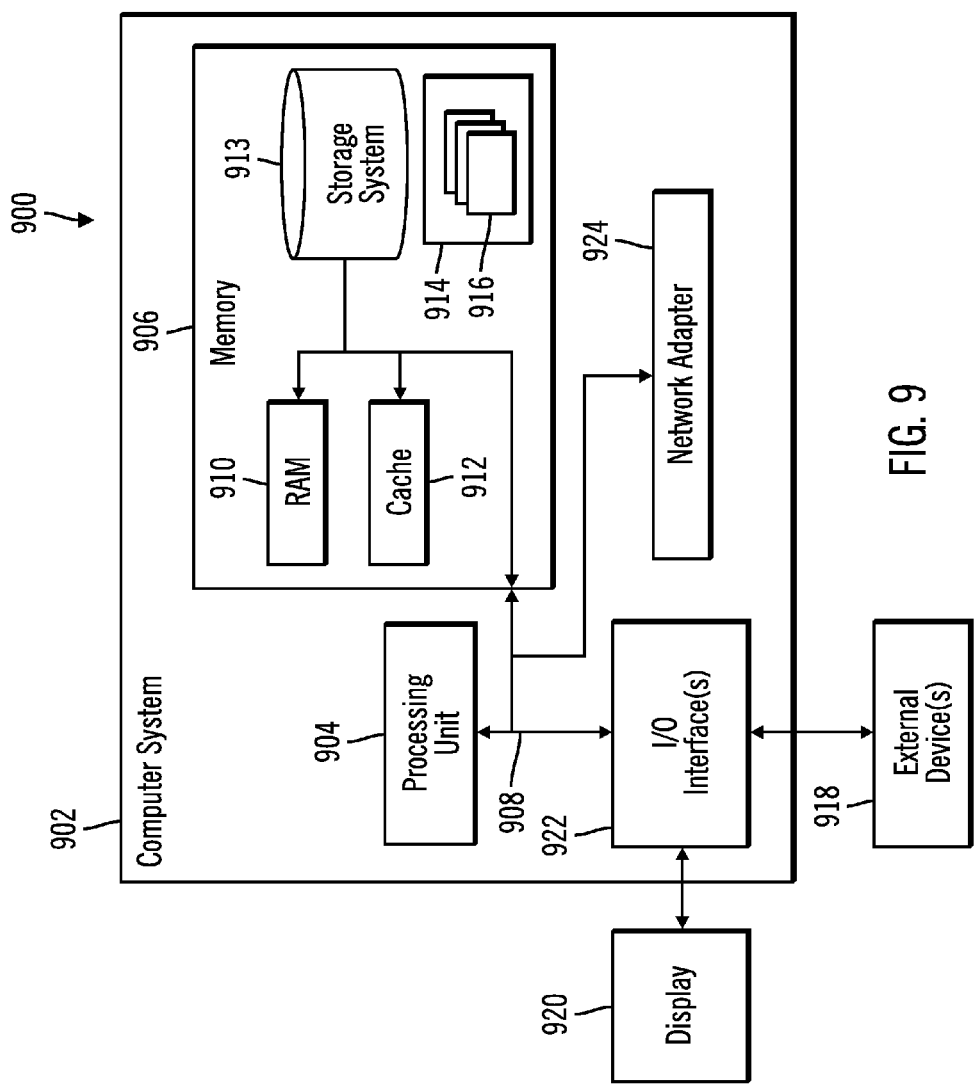
FIG. 9 illustrates a computing environment in which the components of FIG. 1 may be implemented.

The computational components of FIG. 1, including the hosts 102a, 102b . . . 102n and storage controller 104, may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912.

Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data.

Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing tracks in a storage in a cache accessed by a plurality of processors, the computer program product comprising a computer readable storage medium having computer readable program code embodied therein that when executed performs operations, the operations comprising:

indicating tracks in the storage stored in the cache in lists, wherein there is one list for each of the plurality of processors, wherein each of the processors is dedicated to processing tracks indicated in one of the lists, wherein each of the processors processes the list for which that processor is dedicated to process the tracks in the cache indicated on the list, wherein each of the lists includes track identifiers of tracks in the cache, wherein a track identifier comprises at least one of a track address or a cache control block index for the track;

determining one of the lists from which to select a track of the tracks in the cache indicated in the determined list to demote; and demoting a track identified by a track identifier of the selected track from the cache.

2. The computer program product of claim 1, wherein for each list of the lists, there is a separate lock that needs to be obtained to add and move track identifiers for the tracks in the cache in the list.

3. The computer program product of claim 2, wherein the lock is obtained on the determined list to perform the demoting of the selected track indicated in the determined list.

4. The computer program product of claim 1, wherein the determining one of the lists comprises processing the lists to determine the list having an entry indicating the track that has been in the cache for a longest period of time.

5. The computer program product of claim 4, wherein for each list of the lists, there is a separate lock that needs to be obtained to move track identifiers for the tracks in cache included in the list to a most recently used end, and wherein the lists are processed to determine the list having the entry in the cache for the longest period of time without obtaining the lock on the list.

6. The computer program product of claim 1, wherein the operations further comprise:
adding a track to the cache;
applying a function to a control block identifier for the track added to the cache to determine one of the lists in which to include a track identifier of the track added to the cache; and
adding the track identifier to a most recently used end of the determined list, wherein the track demoted from the cache is selected from a least recently used end of the determined list.

7. The computer program product of claim 1, wherein there are a plurality of lists, one for each of the processors, for each of a plurality of different data types of the tracks in the storage, wherein the operations further comprise:
selecting one of the data types, wherein the determined one of the lists is determined from the lists for the selected data type.

8. The computer program product of claim 7, wherein the data types comprise at least a sequential accessed data and random accessed data.

9. The computer program product of claim 7, wherein there is a cumulative counter for each of the data types, wherein the cumulative counter for one of the data types indicates a number of entries in the lists for the data type indicating tracks cached of the data type, wherein the selecting of one of the data types comprises selecting the data type whose cumulative counter is greater than the cumulative counters of the other data types.

10. The computer program product of claim 7, wherein the selecting one of the data types comprises selecting the data type such that the demoting of the track for that data type will have a least adverse effect on a cache hit rate among the data types of the tracks in the cache.

11. A system for managing tracks in a storage, comprising:
a plurality of processors;
a cache; and
a cache manager that when executed performs operations, the operations comprising:
indicating tracks in the storage stored in the cache in lists, wherein there is one list for each of the plurality of the processors, wherein each of the processors is dedicated to processing tracks indicated in one of the lists, wherein each of the processors processes the list for which that processor is dedicated to process the tracks in the cache indicated on the list, wherein each of the lists includes track identifiers of tracks in the cache, wherein a track identifier comprises at least one of a track address or a cache control block index for the track;
determining one of the lists from which to select a track of the tracks in the cache indicated in the determined list to demote; and
demoting a track identified by a track identifier of the selected track from the cache.

12. The system of claim 11, wherein the determining one of the lists comprise processing the lists to determine the list having an entry indicating the track that has been in the cache for a longest period of time.

13. The system of claim 12, wherein for each list of the lists, there is a separate lock that needs to be obtained to move track identifiers for the tracks in cache included in the list to a most recently used end, and wherein the lists are processed to determine the list having the entry in the cache for the longest period of time without obtaining the lock on the list.

14. The system of claim 11, wherein the operations further comprise:
adding a track to the cache;
applying a function to a control block identifier for the track added to the cache to determine one of the lists in which to include a track identifier of the track added to the cache; and
adding the track identifier to a most recently used end of the determined list, wherein the track demoted from the cache is selected from a least recently used end of the list.

15. The system of claim 11, wherein there are a plurality of lists, one for each of the processors, for each of a plurality of different data types of the tracks in the storage, wherein the operations further comprise:
selecting one of the data types, wherein the determined one of the lists is determined from the lists for the selected data type.

16. The system of claim 15, wherein the selecting one of the data types comprises selecting the data type such that the demoting of the track for that data type will have a least adverse effect on a cache hit rate among the data types of the tracks in the cache.

17. A method for managing tracks in a storage in a cache, comprising:
indicating tracks in the storage stored in the cache in lists, wherein there is one list for each of a plurality of processors, wherein each of the processors is dedicated to processing tracks indicated in one of the lists, wherein each of the processors processes the list for which that processor is dedicated to process the tracks in the cache indicated on the list, wherein each of the lists includes track identifiers of tracks in the cache, wherein a track identifier comprises at least one of a track address or a cache control block index for the track;
determining one of the lists from which to select a track of the tracks in the cache indicated in the determined list to demote; and
demoting a track identified by a track identifier of the selected track from the cache.

18. The method of claim 17, wherein the determining one of the lists comprise processing the lists to determine the list having an entry indicating the track that has been in the cache for a longest period of time.

19. The method of claim 18, wherein for each list of the lists, there is a separate lock that needs to be obtained to move track identifiers for the tracks in cache included in the list to a most recently used end, and wherein the lists are processed to determine the list having the entry in the cache for the longest period of time without obtaining the lock on the list.

20. The method of claim 17, further comprising:
adding a track to the cache;
applying a function to a control block identifier for the track added to the cache to determine one of the lists in which to include a track identifier of the track added to the cache; and
adding the track identifier to a most recently used end of the determined list, wherein the track demoted from the cache is selected from a least recently used end of the determined list.

21. The method of claim 17, wherein there are a plurality of lists, one for each of the processors, for each of a plurality of different data types of the tracks in the storage, further comprising:
selecting one of the data types, wherein the determined one of the lists is determined from the lists for the selected data type.

22. The method of claim 21, wherein the selecting one of the data types comprises selecting the data type such that the demoting of the track for that data type will have a least adverse effect on a cache hit rate among the data types of the tracks in the cache.

\* \* \* \* \*